(12) United States Patent  
Cohen

(10) Patent No.: US 6,334,580 B2
(45) Date of Patent: *Jan. 1, 2002

(54) GASEOUS INJECTOR WITH COLUMNATED JET ORIFACE FLOW DIRECTING DEVICE

(75) Inventor: James H. Cohen, Virginia Beach, VA (US)

(73) Assignee: Siemens Automotive Corporation, Auburn Hills, MI (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/320,175

(22) Filed: May 26, 1999

(51) Int. Cl.$^7$ ....................................... B05B 1/30
(52) U.S. Cl. ................... 239/585.4; 239/533.21; 239/590.5
(58) Field of Search ............... 239/585.1, 585.5, 239/533.2, 533.12, 590.5

(56) References Cited

U.S. PATENT DOCUMENTS

| | | | |
|---|---|---|---|
| 3,937,855 A | | 2/1976 | Gurenwald |
| 4,331,317 A | | 5/1982 | Kamia et al. |
| 4,586,017 A | | 4/1986 | Laskaris et al. |
| 4,688,723 A | * | 8/1987 | Kern et al. ............ 239/585.3 |
| 5,129,381 A | * | 7/1992 | Nakajima ............ 239/533.2 |
| 5,174,505 A | * | 12/1992 | Shen ............ 239/585.1 |
| 5,232,167 A | | 8/1993 | McCormick et al. |
| 5,301,874 A | | 4/1994 | Vogt et al. |
| 5,344,081 A | | 9/1994 | Wakeman |
| 5,383,606 A | | 1/1995 | Stegamier et al. |
| 5,494,223 A | * | 2/1996 | Hall et al. ............ 239/585.5 |
| 5,566,920 A | * | 10/1996 | Romann et al. ............ 239/585.4 |
| 5,730,367 A | * | 3/1998 | Pace et al. ............ 239/585.4 |
| 5,758,865 A | | 6/1998 | Casey |
| 5,785,251 A | * | 7/1998 | Wood et al. ............ 239/585.4 |
| 5,860,601 A | * | 1/1999 | Egizi ............ 239/585.5 |
| 5,915,626 A | | 6/1999 | Awarzamani et al. |
| 5,918,818 A | | 7/1999 | Takeda |
| 5,921,475 A | * | 7/1999 | DeVriese et al. ............ 239/585.4 |

* cited by examiner

Primary Examiner—Lesley D. Morris
Assistant Examiner—Dinh Q. Nguyen

(57) ABSTRACT

An electromagnetically operable fuel injector for a gaseous fuel injection system of an internal combustion engine, said injector having a generally longitudinal axis, which comprises, a ferromagnetic core, a magnetic coil at least partially surrounding the ferromagnetic core, an armature magnetically coupled to the magnetic coil and being movably responsive to the magnetic coil, the armature actuating a valve closing element which interacts with a fixed valve seat of a fuel valve and being movable away from the fixed valve seat when the magnetic coil is excited. The fixed valve seat defining a fuel valve aperture. The armature has a generally elongated shape and a generally central opening for axial reception and passage of gaseous fuel from a fuel inlet connector positioned adjacent thereto, the fuel inlet connector and the armature being adapted to permit a first flow path of gaseous fuel between the armature and the magnetic coil as part of a path leading to the fuel valve. At least one fuel jet columnating device is positioned below the fuel valve for receiving fuel flow from the valve aperture in a stream having a first transverse dimension, and for permitting the stream to widen into a funnel shaped section having a transverse dimension greater than the first transverse dimension, and to thereafter columnate the stream to a transverse dimension greater than the transverse dimension of the valve aperture.

7 Claims, 3 Drawing Sheets

GASEOUS INJECTOR WITH COLUMNATED JET ORIFACE FLOW DIRECTING DEVICE

BACKGROUND OF THE INVENTION

1. Field of the Invention

The present application relates to a compressed natural gas injector which is tolerant of contamination in the gas.

2. Description of the Related Art

Compressed natural gas (hereinafter sometimes referred to as "CNG") is becoming a common automotive fuel for commercial fleet vehicles and residential customers. In vehicles, the CNG is delivered to the engine in precise amounts through gas injectors, hereinafter referred to as "CNG injectors". The CNG injector is required to deliver a precise amount of fuel per injection pulse and maintain this accuracy over the life of the injector. In order to maintain this level of performance for a CNG injector, certain strategies are required to help reduce the effects of contaminants in the fuel and to deliver the fuel to the intake manifold in precise amounts and flow patterns.

In general, fuel injectors require extremely tight tolerances on many of the internal components to accurately meter and deliver the fuel. We have invented a CNG fuel injector which incorporates a novel fuel columnating jet device which assists in precision delivery of the fuel, reduces engine misfire, and improves exhaust emissions.

SUMMARY OF THE INVENTION

An electromagnetically operable fuel injector for a gaseous fuel injection system of an internal combustion engine, said injector having a generally longitudinal axis, which comprises, a ferromagnetic core, a magnetic coil at least partially surrounding the ferromagnetic core, an armature magnetically coupled to the magnetic coil and being movably responsive to the magnetic coil, the armature actuating a valve closing element which interacts with a fixed valve seat of a fuel valve and being movable away from the fixed valve seat when the magnetic coil is excited, the fixed valve seat defining a fuel valve aperture. The armature has a generally elongated shape and a generally central opening for axial reception and passage of gaseous fuel from a fuel inlet connector positioned adjacent thereto, the fuel inlet connector and the armature being adapted to permit a first flow path of gaseous fuel between said armature and said magnetic coil as part of a path leading to said fuel valve. At least one fuel jet columnating device is positioned below the fuel valve for receiving fuel flow from the valve aperture in a stream having a first transverse dimension, and for permitting the stream to widen into a funnel shaped section having a transverse dimension greater than the first transverse dimension, and to thereafter columnate stream to a transverse dimension greater than the transverse dimension of the valve aperture.

The fuel inlet connector and the armature are spaced to define a working gap therebetween and are adapted to permit the first flow path of gaseous fuel within said working gap. The valve body is positioned downstream of the armature and has at least one aperture in a wall portion thereof for reception of fuel from at least two of the flow paths of gaseous fuel from the armature and the fuel inlet connector. The fuel injector further comprises a valve body shell at least partially surrounding the armature and the valve body, the valve body shell defining a radial space with the armature for passage of the first flow path of gaseous fuel between the armature and the valve body shell. The fuel inlet connector is positioned above the armature and is spaced from the armature by a working gap, the fuel inlet connector defining a through passage for directing fuel toward the armature and the fixed valve seat.

BRIEF DESCRIPTION OF THE DRAWINGS

Preferred embodiments of the invention are described hereinbelow with reference to the drawings wherein.

DESCRIPTION OF THE PREFERRED EMBODIMENTS

Figure 1:
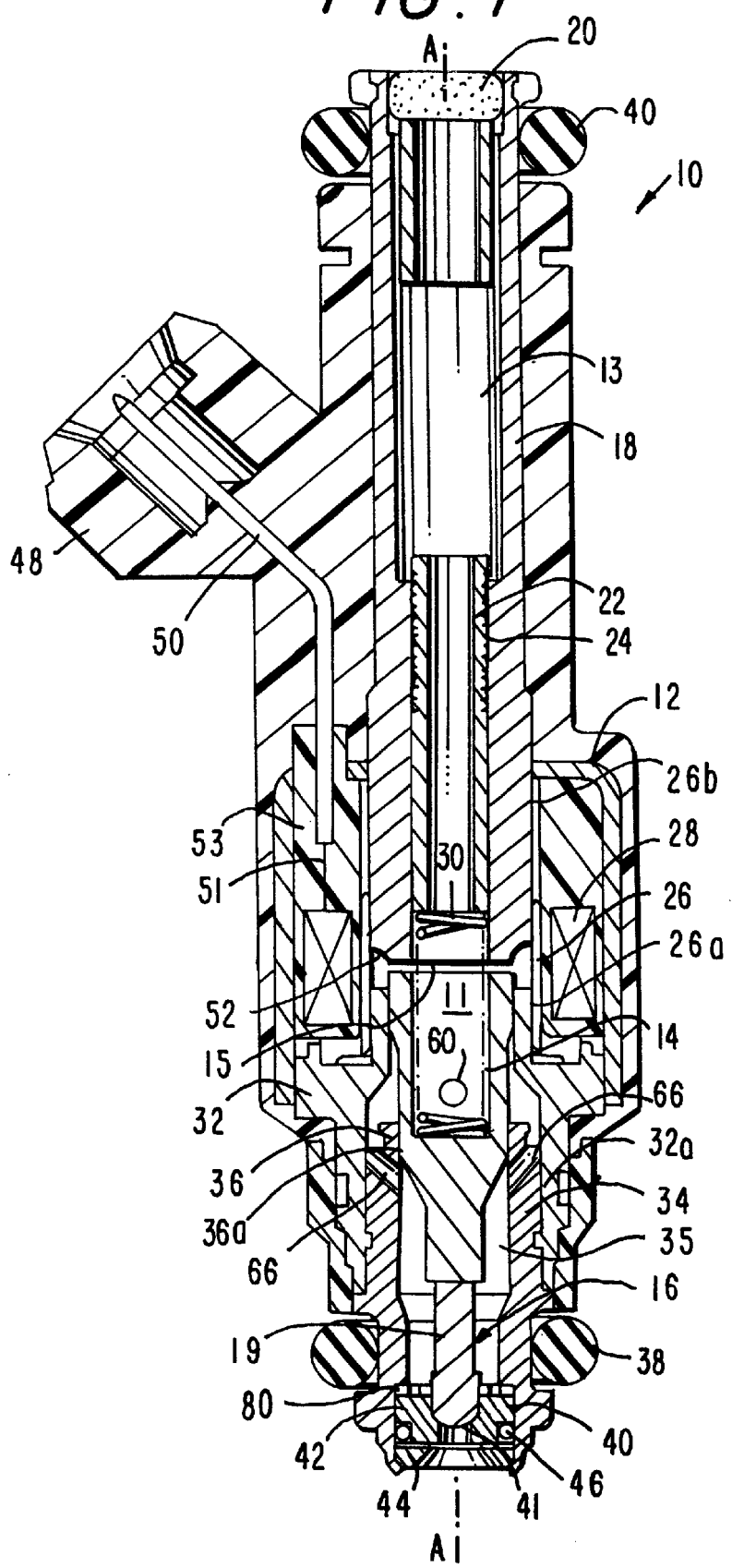
FIG. 1 is an elevational view, partially in cross-section, of a compressed natural gas injector for which the jet orifice flow directing device according to the present invention is contemplated.

Referring initially to FIG. 1 there is shown a CNG injector 10 which is constructed according to the present invention. Injectors of the type contemplated herein are described in commonly assigned U.S. Pat. No. 5,494,224, the disclosure of which is incorporated by reference herein. Significant features of the present invention are also disclosed in commonly assigned, commonly filed application Ser. No. 09/320,178 copending application entitled "Contaminant Tolerant Natural Gas Injector and Method of Directing Gaseous Fuel Therethrough," the disclosure of which is incorporated herein by reference.

The injector 10 includes housing 12 containing armature 14 to which valve needle 16 is attached by crimping as will be described later in conjunction with FIG. 12. Fuel inlet connector 18 includes central fuel flow opening 13 and CNG filter 20 at the upper end portion of opening 13 as shown. The fuel inlet connector 18 also includes adjusting tube 22 connected thereto at 24 by a known crimping procedure. Housing 12 includes inner non-magnetic shell 26 which surrounds the inlet connector 18 and armature 14 having central fuel flow opening 11 as shown. Armature 14 and inlet connector 18 define with housing 12, an enclosure for coil 28 which is selectively energized to move armature 14 and needle 16 upwardly to open the valve aperture 41, and selectively deenergized to permit armature 14 and needle 16 to return to the "closed valve" position as shown, under the force of coil spring 30. Fuel flow into the injector begins at filter 20 and passes through fuel inlet connector 18, to armature 14, and ultimately to valve aperture 41 of valve seat 40 into the intake manifold of the engine (not shown).

Figure 2:
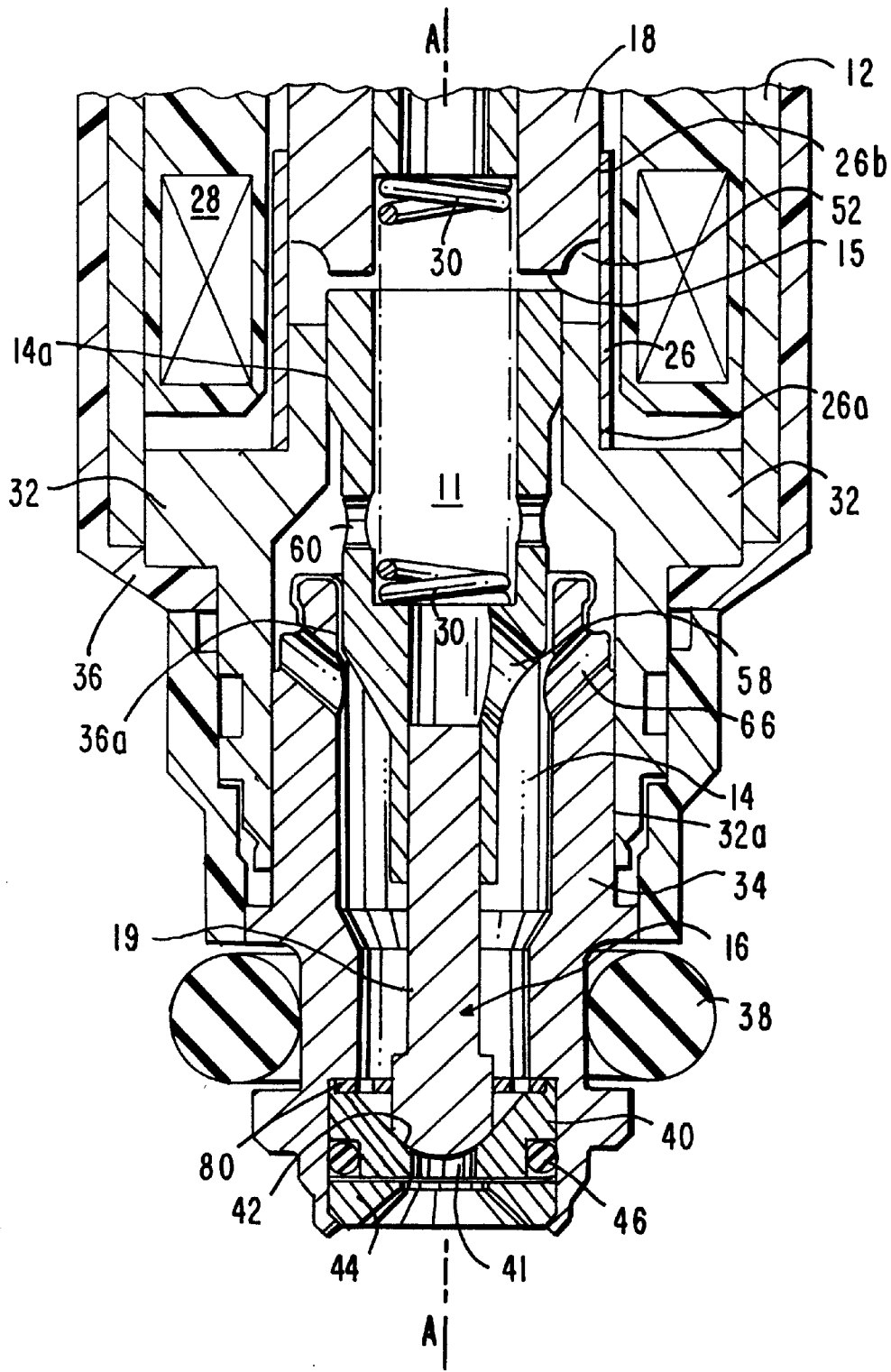
FIG. 2 is an enlarged elevational cross-sectional view of the lower portion of the injector of FIG. 1.

Referring further to FIG. 1 in conjunction with FIG. 2, valve body shell 32, which is made of a ferromagnetic material and which forms part of a magnetic circuit, surrounds valve body 34 and has at the upper end, upper guide 36 as shown. Space 36a between upper guide 36 and armature 14 is about 0.010 to about 0.015 mm on the diameter, and permits guiding movement of armature 14. Lower O-rings 38 provide sealing between the injector 10 and the engine intake manifold (not shown) and upper O-rings 40 provide sealing between the injector 10 and the fuel rail (also not shown). Valve body 34 defines central fuel flow opening 35.

In FIG. 2, valve body shell 32 is attached to valve body 34, preferably by weld 32a, and at the upper end by weld 26a, to non-magnetic shell 26. Non-magnetic shell 26 is in turn welded to fuel inlet connector at 26b. Thus, fuel flowing from fuel inlet connector 18 across working gap 15 must flow through the clearance space 14a between armature 14 and valve body shell 32 which is also provided to permit upward and downward movement of armature 14. The space 14a approximately 0.10 to 0.30 mm on the diameter.

Referring again to FIGS. 1 and 2, valve seat 40 contains a valve orifice 41 and a funnel shaped needle rest 42 having a frusto-conical cross-sectional shape. The valve seat 40 is maintained in position by back-up washer 44 and sealed against fuel leakage with valve body 34 by O-ring 46. Overmold 48 of suitable plastic material such as nylon supports terminal 50 which extends into coil 28 and is connected via connection 51 to provide selective energization of the coil to open the valve by raising the armature 14 and valve needle 16 against the force of spring 30. Coil 28 is surrounded by dielectric plastic material 53 as shown in the Figs.

In injectors of this type, the interface space 15 (or working gap 15) between the inlet connector and the armature is extremely small, i.e. in the order of about 0.3 mm (millimeters). However in comparison to gasoline injectors it is relatively large, since the working gap in gasoline injectors is between about 0.08 mm and 0.14 mm.

Figure 3:
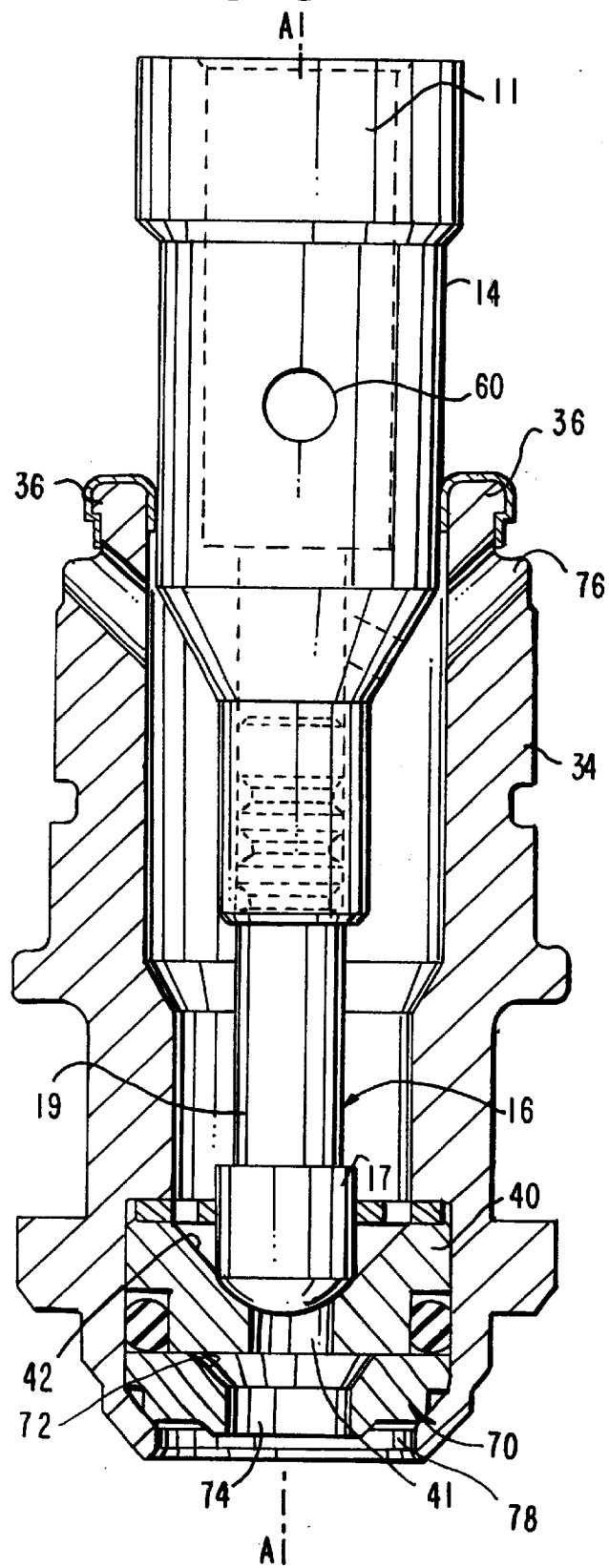
FIG. 3 is an enlarged elevational view of the armature shown in FIGS. 1 and 2 and a cross-sectional view of the valve body shown in FIGS. 1 and 2, incorporating jet orifice fuel flow directing device constructed according to the invention.

Referring now to FIG. 3, the injector 10 incorporates a fuel columnating jet device 70 which includes a shallow funnel shaped section 72 connected to a generally tubular shaped columnating section 74. Gaseous fuel passing through valve aperture 41 is then allowed to pass through funnel shaped section 72 so that the stream widens, and then to be columnated into a steady gaseous stream in columnating section 74. The transverse dimension of the columnated stream is greater than the transverse dimension of fuel valve aperture 41. Retainer disc 78 is provided to retain the jet device 60 in position below fuel valve aperture 41. The fuel columnating device 74 enhances mixture quality, reduces fuel delivery time and enables single or multiple discharge orientation for improved gaseous flow targeting. A narrow gaseous flow discharge angle can entrain the surrounding working fluid (mostly air) and can impart useful turbulent energies to directed air/fuel mixtures flowing through a port, intake valve and/or into a combustion chamber to reduce in-cylinder air/fuel mixture gradients. This feature has proven to significantly reduce engine misfire and to improve exhaust emissions.

It has been found that the injector of the present invention provides improved operation, particularly by improving the flow pattern of the CNG as described, and improving the control over the flow of gas directed to the intake manifold.

Although the present invention is particularly intended for use with CNG fuels, it is self evident that the use of any liquid or gaseous fuels are contemplated, particular those fuels which are relatively high in contamination, since the tolerance of the contaminants has been fully addressed by the disclosed structures.

Although the invention has been described in detail with reference to the illustrated preferred embodiments, variations and modifications may be provided within the scope and spirit of the invention as described and as defined by the following claims.

What is claimed is:

1. An electromagnetically operable fuel injector for a gaseous fuel injection system of an internal combustion engine, said injector having a generally longitudinal axis, which comprises:
   a) a ferromagnetic core;
   b) a magnetic coil at least partially surrounding the ferromagnetic core;
   c) an armature magnetically coupled to said magnetic coil and being movably responsive to said magnetic coil, said armature actuating a valve closing element which interacts with a fixed valve seat of a fuel valve and being movable away from said fixed valve seat when said magnetic coil is excited, said fixed valve seat defining a fuel valve aperture, said armature having a generally elongated shape and a generally central opening for axial reception and passage of gaseous fuel from a fuel inlet connector positioned adjacent thereto, said fuel inlet connector and said armature being adapted to permit a first flow path of gaseous fuel from a fuel inlet connector positioned adjacent thereto, said fuel inlet connector and said armature being adapted to permit a first flow path of gaseous fuel between said armature and said magnetic coil as part of a path leading to said fuel valve; and
   d) at least one fuel jet columnating device positioned below said fuel valve for receiving fuel flow from said valve aperture in a stream having a first transverse dimension, and for permitting said stream to widen into a funnel shaped section having a transverse dimension greater than said first transverse dimension, said funnel shaped section tapering in a direction of fuel flow, and to thereafter columnate said stream to a transverse dimension greater than the transverse dimension of said valve aperture.

2. The electromagnetically operable fuel injector according to claim 1, wherein said fuel inlet connector and said armature are spaced to define a working gap therebetween and are adapted to permit said first flow path of gaseous fuel within said working gap.

3. The electromagnetically operable fuel injector according to claim 2, further comprising a valve body positioned downstream of said armature and having at least one aperture in a wall portion thereof for reception of fuel from at least two of said flow paths of gaseous fuel from said armature and said fuel inlet connector.

4. The electromagnetically operable fuel injector according to claim 3, further comprising a valve body shell at least partially surrounding said armature and said valve body, said valve body shell defining a radial space with said armature for passage of said first flow path of gaseous fuel between said armature and said valve body shell.

5. The electromagnetically operable fuel injector according to claim 4, wherein said fuel inlet connector is positioned above said armature and is spaced from said armature by a working gap, said fuel inlet connector defining a through passage for directing fuel toward said armature and said fixed valve seat.

6. An electromagnetically operable fuel injector for a compressed natural gas fuel injection system of an internal combustion engine, said injector having a generally longitudinal axis, which comprises:
   a) a ferromagnetic core;
   b) a magnetic coil at least partially surrounding the ferromagnetic core;
   c) an armature coupled to said magnetic coil and movably responsive to said magnetic coil, said armature having a first upper end face and a lower end portion;
   d) a valve closing element connected to said lower end portion of said armature and interactive with a fixed valve seat defining a fuel valve aperture to selectively permit fuel to pass through said valve seat as said valve closing element is moved to a valve open position by said armature;
   e) a fuel inlet connector extending in a generally longitudinal direction above said armature and defining a path for fuel to enter said inlet connector and to be directed toward said armature, said fuel inlet connector having a lowermost end portion having a lowermost surface spaced above said armature to define working gap through which said armature is movable; and f) a fuel columnating jet device positioned below said fuel valve, said columnating jet device having a first funnel shaped section to receive a flow of gaseous fuel from said fuel valve, said first funnel shaped section tapering in a direction of fuel flow, and a second generally cylindrical section positioned downstream of said first funnel shaped section, said generally cylindrical section having a cross-sectional dimension greater than a cross-sectional dimension of said aperture of said fuel valve.

7. An electromagnetically operable gaseous fuel injector for an internal combustion engine, the fuel injector comprising:

a magnetic stator;

an armature magnetically movable along a longitudinal axis with respect to the magnetic stator;

a valve closing element operatively connected to the armature;

a fuel valve seat adapted for engaging the valve closing element, the fuel valve seat including a valve aperture disposed downstream of the valve closing element, the valve aperture having a first transverse cross-sectional area; and a fuel jet columnating device disposed downstream of the fuel valve seat, the fuel jet columnating device including an upper section and a lower section disposed downstream of the upper section, the upper section having a second transverse cross-sectional area, and the lower section having a third transverse cross-sectional area, the second transverse cross-sectional area being greater than the first transverse cross-sectional area, the third transverse cross-sectional area being greater than the first transverse cross-sectional area, and the second transverse cross-sectional area being at least as great as the third transverse cross-sectional area.

* * * * *

UNITED STATES PATENT AND TRADEMARK OFFICE
CERTIFICATE OF CORRECTION

PATENT NO.    : 6,334,580 B2
DATED         : January 1, 2002
INVENTOR(S)   : James H. Cohen It is certified that error appears in the above-identified patent and that said Letters Patent is hereby corrected as shown below:

Title page,
Item [54], the title of the invention should read as follows:
-- [54]  GASEOUS INJECTOR WITH COLUMNATED JET ORIFICE FLOW DIRECTING DEVICE --

Signed and Sealed this

Twenty-fourth Day of September, 2002

Attest:

JAMES E. ROGAN
Attesting Officer    Director of the United States Patent and Trademark Office